(12) United States Patent
Lemes da Silva et al.

(10) Patent No.: US 11,425,335 B2
(45) Date of Patent: Aug. 23, 2022

(54) PROTECTING PRIVACY IN VIDEO CONTENT

(71) Applicant: Hewlett-Packard Development Company, L.P., Spring, TX (US)

(72) Inventors: Fernando Lemes da Silva, Barueri (BR); Ricardo Ribani, Barueri (BR); Claudio Andre Heckler, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/265,539

(22) PCT Filed: Nov. 19, 2018

(86) PCT No.: PCT/US2018/061824
§ 371 (c)(1),
(2) Date: Feb. 3, 2021

(87) PCT Pub. No.: WO2020/106271
PCT Pub. Date: May 28, 2020

(65) Prior Publication Data
US 2021/0297629 A1    Sep. 23, 2021

(51) Int. Cl.
| | |
|---|---|
| *H04N 7/15* | (2006.01) |
| *G06K 9/62* | (2022.01) |
| *G06N 3/04* | (2006.01) |
| *G06N 3/08* | (2006.01) |
| *G06T 7/20* | (2017.01) |
| *G06V 20/40* | (2022.01) |

(52) U.S. Cl.
CPC ............ *H04N 7/15* (2013.01); *G06K 9/6256* (2013.01); *G06K 9/6267* (2013.01); *G06N 3/04* (2013.01); *G06N 3/088* (2013.01); *G06T 7/20* (2013.01); *G06V 20/46* (2022.01); *G06T 2207/10016* (2013.01); *G06T 2207/20081* (2013.01); *G06T 2207/20084* (2013.01)

(58) Field of Classification Search
CPC ... G06K 9/62; G06K 9/68; G06K 9/74; G06T 7/11; G06T 7/194; G06N 3/08; G06N 3/04
USPC ........................................... 348/14.01–14.16
See application file for complete search history.

(56) References Cited

U.S. PATENT DOCUMENTS

| | | | |
|---|---|---|---|
| 7,911,513 B2 | 3/2011 | Garrison et al. |
| 8,723,912 B2 | 5/2014 | Michrowski et al. |
| 9,083,850 B1 | 7/2015 | Higgs |
| 9,661,239 B2 | 5/2017 | Guissin |

(Continued)

FOREIGN PATENT DOCUMENTS

WO    WO-2018022010 A1    2/2018

*Primary Examiner* — Melur Ramakrishnaiah
(74) *Attorney, Agent, or Firm* — Fabian VanCott (57) ABSTRACT

A method of protecting privacy in video may include classifying, via a trained multi-level neural network, a plurality of objects within frames of a video content. Training the multi-level neural network may include inputting a plurality of pixels of at least one frame, fitting the pixels into different layers, and assigning weights to individual components within the layers. The method may also include determining if the classified objects are private objects or non-private objects, tracking the detected objects between each frame of the video content within a threshold distance of movement, and masking the private objects.

20 Claims, 7 Drawing Sheets

(56) References Cited

U.S. PATENT DOCUMENTS

| | | |
|---|---|---|
| 9,729,824 B2 | 8/2017 | Cutler et al. |
| 9,854,206 B1 * | 12/2017 | Ren .................. H04N 7/147 |
| 10,402,689 B1 * | 9/2019 | Bogdanovych ...... G06K 9/6256 |
| 2008/0174427 A1 | 7/2008 | Banerjee et al. |
| 2011/0202850 A1 | 8/2011 | Chan et al. |
| 2013/0019186 A1 | 1/2013 | Lance et al. |
| 2014/0023248 A1 | 1/2014 | Yoo et al. |
| 2014/0362163 A1 | 12/2014 | Winterstein et al. |
| 2016/0155465 A1 | 6/2016 | Park et al. |
| 2017/0140557 A1 | 5/2017 | Guo et al. |
| 2017/0148487 A1 | 5/2017 | Krishnakumar et al. |
| 2017/0220816 A1 | 8/2017 | Matusek et al. |
| 2017/0316487 A1 * | 11/2017 | Mazed ............... G06Q 30/0241 |
| 2018/0205550 A1 * | 7/2018 | Appleyard ........... G06V 40/169 |
| 2018/0268240 A1 | 9/2018 | Loce et al. |
| 2019/0279082 A1 * | 9/2019 | Moloney .................. G06N 3/08 |
| 2020/0098096 A1 * | 3/2020 | Moloney ............. G06V 10/454 |

\* cited by examiner

PROTECTING PRIVACY IN VIDEO CONTENT

BACKGROUND

Computing devices are ubiquitous throughout the world, and may be used in various locations since many of these computing devices are mobile computing devices such as laptop computing devices, smart phones, and tablet computing devices. This provides a user with the ability to work and communicate via the computing device at almost anytime and anywhere.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Due to computing devices being so ubiquitous throughout the world, security and privacy with regard to information displayed on display device of these computing devices may be a concern. In open areas such as in open-floor office spaces and in public restaurants such as coffee shops, it may be possible to image other individuals' display devices using an imaging device on an individual's computer such as a video conferencing camera. In this scenario, confidential or private information may be presented on other individuals' display devices which may be captured by the imaging device.

For example, in an open-floor plan office space, several workstations may be arranged within the office space without barriers such as cubicle barriers or other privacy measures. These workstations may be arranged such that imaging devices of the computing devices located at those workstations may be able to capture images of other computing devices' display devices. These other computing devices may be presenting confidential or private information on their display devices. Thus, if one individual is to engage in, for example, a video conferencing instance in which the imaging device of that individual's computing device is capturing images in the background of other user's computing device's display devices, this may cause confidential or private information to be viewed and/or recorded via the video conferencing instance. Thus, ensuring that users engaging in utilization of an imaging device such as a video conferencing imaging device within a public area or shared workspace area are not inadvertently broadcasting information found on other individuals' display devices may be accomplished by the examples described herein.

Examples described herein provide a method of protecting privacy in video. The method may include classifying, via a trained multi-level neural network, a plurality of objects within frames of a video content. Training the multi-level neural network may include inputting a plurality of pixels of at least one frame, fitting the pixels into different layers, and assigning weights to individual components within the layers. The method may also include determining if the classified objects are private objects or non-private objects, tracking the detected objects between each frame of the video content within a threshold distance of movement, and masking the private objects.

The method may also include reclassifying the plurality of objects within the frames of the video content in response to a detection of movement of a previously classified object within the frames past the threshold distance of movement. The video is captured via a video conferencing device. The trained multi-level neural network may be a self-learning neural network.

The method may also include detecting a shift of a privacy screen from a private viewing angle to a non-private viewing angle within the frames of the video content, and classifying the privacy screen as a private object in response to a detection of the privacy screen being oriented at the non-private viewing angle. Tracking the detected objects between each frame of the video content may include tracking the detected objects between less than all the frames.

Examples described herein provide a non-transitory computer readable medium including computer usable program code embodied therewith. The computer usable program code may, when executed by a processor, classify, via a trained multi-level neural network, a plurality of objects within frames of a video content. The computer usable program code may determine if the classified objects are private objects or non-private objects, detect a shift of a privacy screen from a private viewing angle to a non-private viewing angle within the frames of the video content, classify the privacy screen as a private object in response to a detection of the privacy screen being oriented at the non-private viewing angle, and mask the private objects.

The computer readable medium may also include computer usable program code to, when executed by the processor, track the detected objects between the frames of the video content within a threshold distance of movement. Tracking the detected objects between the frames of the video content within a threshold distance of movement may include tracking the detected objects between less than all the frames. Classifying the plurality of objects within frames may include inputting a plurality of pixels of at least one frame, fitting the pixels into different layers, and assigning weights to individual components within the layers. The frames of the video content may be captured using a video conferencing imaging device.

Examples described herein provide an image capture device for protecting privacy in video content. The image capture device may include a neural network to classify a plurality of objects within frames of video content captured by the image capture device, a tracking module to track the detected objects between the frames of the video content within a threshold distance of movement, a masking module to mask private objects within the frames, and a reclassifying module to reclassify the plurality of objects within the frames of the video content in response to a detection of movement of a previously classified object within the frames past the threshold distance of movement.

The neural network may fit a plurality of pixels of at least one frame into different layers, assign weights to individual components within the layers, and determine if the classified objects are the private objects or are non-private objects. The image capture device may also include a privacy screen detection module to detect a shift of a privacy screen from a private viewing angle to a non-private viewing angle within the frames of the video content, and classify the privacy screen as a private object in response to a detection of the privacy screen being oriented at the non-private viewing angle. The tracking module tracks the detected objects between less than all the frames.

Figure 1:
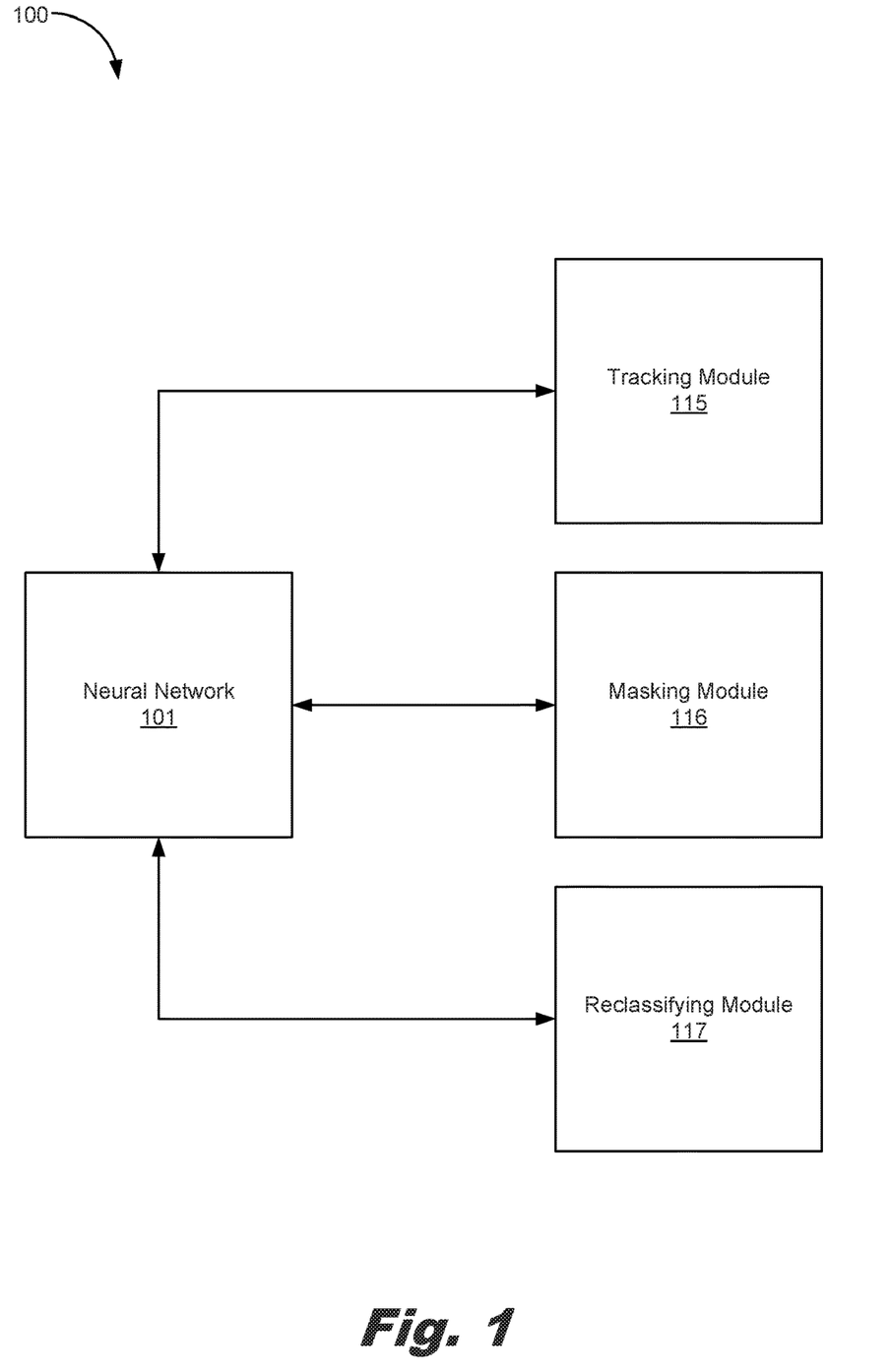
FIG. 1 is a block diagram of an image capture device for protecting privacy in video content, according to an example of the principles described herein.

Turning now to the figures, FIG. 1 is a block diagram of an image capture device (100) for protecting privacy in video content, according to an example of the principles described herein. The image capture device (100) may include a neural network (120) to classify a plurality of objects within frames of video content captured by the image capture device (100). The neural network (120) may be any artificial neural network, sometimes referred to as neuromorphic and synaptronic computation systems, that are computational systems that permit electronic systems to function in a manner analogous to that of biological brains. A neural network does not utilize a digital model of manipulating 0s and 1s, but, instead, creates connections between processing elements that are roughly functionally equivalent to neurons of a biological brain. A neural network may include various electronic circuits that are modeled on biological neurons. In a neural network, hardware and software serve as neurons that have a given activation function that operates on the inputs. By determining proper connection weights (a process also referred to as "training"), a neural network achieves efficient recognition of desired patterns, such as images and characters within a set of input data. In an example, these neurons may be grouped into "layers" in order to make connections between groups more obvious and to each computation of values. The neural network may be a self-learning neural network. A self-learning neural network is any neural network that may learn of its own accord to control a nonlinear dynamic system. An emulator within a self-learning neural network may include a multilayered neural network that learns to identify the system's dynamic characteristics. A controller, another multilayered neural network, may learn to control the emulator. The self-trained controller may then be used to control the actual dynamic system. The learning process continues as the emulator and controller improve and track the physical process.

The image capture device (100) may also include a tracking module (115) to, when executed by a processing device, detect and track objects within frames of the video content captured by the image capture device (100). The tracking module tracks these objects between the frames of the video content, and determines if the objects have moved between frames of the video content. The tracking module (115) receives from the neural network (120) an identification of various objects within the frames of the video content such as individuals within field of view of the image capture device (100), monitors of computing devices, screens of tablet computing devices, and other items. Tracking the detected objects between each frame of the video content may include tracking the detected objects between less than all the frames. In this example, because movement of objects may not occur on a continuous basis, the tracking module (115) may select a less than all of the frames to analyze in its tracking of objects in the frames. This may reduce strain on computing resources within the image capture device (100). In another example, the tracking module (115) may track objects when movement is detected within the frames. In this example, the tracking module may be executed in order to detect movement, and, in response to detecting the movement, track the objects.

A masking module (116) may also be included in the image capture device (100). The masking module (116), when executed by a processing device, may mask private objects within the frames. A private object may be any object in the field of view of the image capture device (100) that contains information a user or other user may not want to be seen or captured in the video content. For example, the private object may be a display device that may display proprietary information, classified information, private information, or other types of information that a user may desire not to be seen or recorded by another. The masking module (116) may receive from the neural network (120) an identification of private objects identified by the neural network (120) and tracked by the tracking module (115) in order to determine what objects to perform a masking process on within the captured frames. Masking by the masking module (116) may include any distortion of a portion of the frames at which a private object may be located, and may include, for example, blurring, digitizing, obscuring or removing those portions of the frames where the private objects are located.

The image capture device (100) may also include a reclassifying module (117) to reclassify the plurality of objects within the frames of the video content in response to a detection of movement of a previously classified object within the frames past the threshold distance of movement. In instances where the tracked objects move between the frames of the video content within a threshold distance as detected by the tracking module (115), the tracking module (115) may continue to track the objects, and the reclassifying module (117) may continually apply the masking as applied by the masking module (116). For example, where the image capture device (100) is a stationary device coupled directly or indirectly to a table or other surface, bumping of the surface may cause the field of view of the imaging device to shift ever so slightly. In this example, the reclassifying module (117) reclassifies these objects when the tracking module (115) detects a shift in the field of view past a threshold distance, and continues to detect the private objects as identified by the neural network (120). The masking module (116) may also work in tandem with the reclassifying module (117) to continue to mask the private objects based on the action of the reclassifying module (117).

In another example, the mere bumping of a surface to which the image capture device (100) is coupled may not bring about a deviation in the captured images between frames past the threshold of movement. In this example, the tracking module (115) and masking module (116) function as described herein without triggering the functions provided by the reclassifying module (117).

The neural network (120) fits a plurality of pixels of at least one frame of the captured images into different layers. The layers are analogous to objects that may be detected within the frame. Thus, in instances where the pixels are identified as part of a specific type of object such as a piece of furniture or a monitor, the pixel is assigned to a layer that includes that type of object. Weights are assigned to individual components or objects within the layers. The weights may be assigned and adjusted based on how close the output is to a desired output. Training the neural network (120) with a larger amount of training examples from a dataset may include initially randomly assigning weights to each layer, and then adjusting the weights based on how close outputs are to the desired output. The weights, in this manner, assist in strengthening correct outcomes and weakening wrong answers. The neural network (120) determines if the classified objects are the private objects or are non-private objects. In this manner, the neural network (120) learns how to better classify objects in the frames of the video content captured by the image capture device (100).

Figure 2:
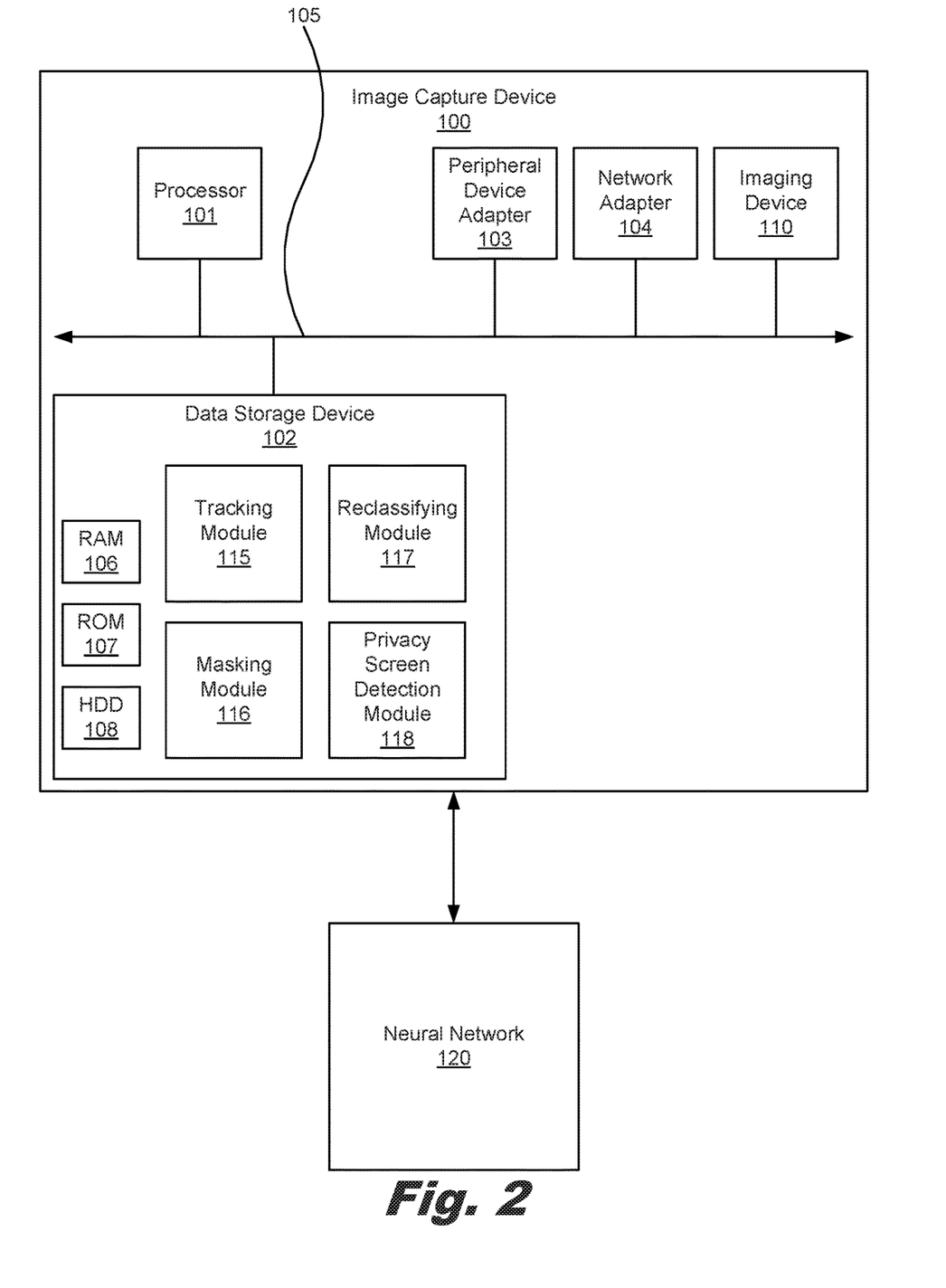
FIG. 2 is a block diagram of an image capture device for protecting privacy in video content, according to an example of the principles described herein.
Figure 3:
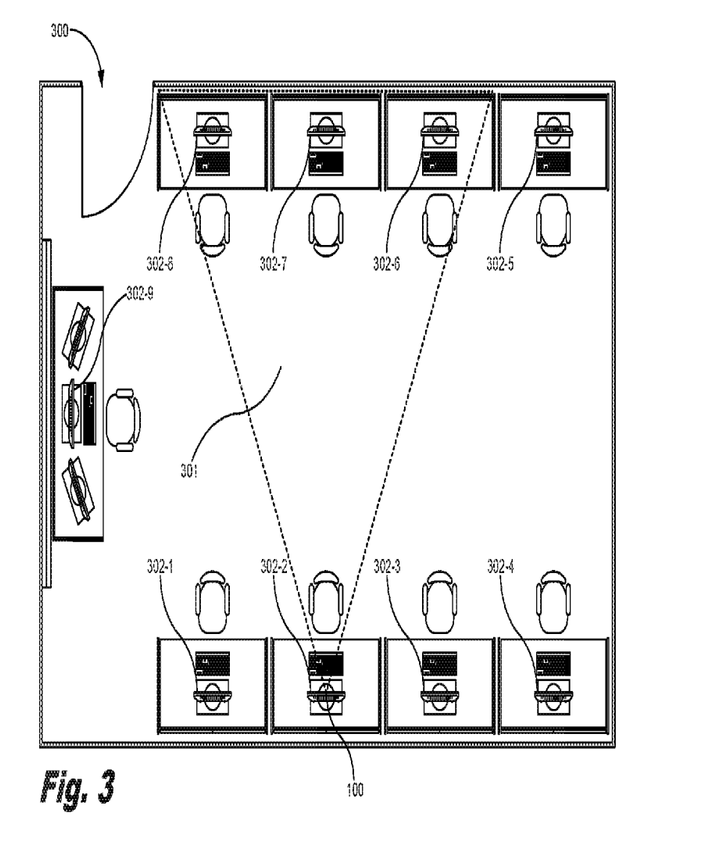
FIG. 3 is a diagram of an office space floor plan including an exposed, private area from the perspective of an imaging device, according to an example of the principles described herein.
Figure 4:
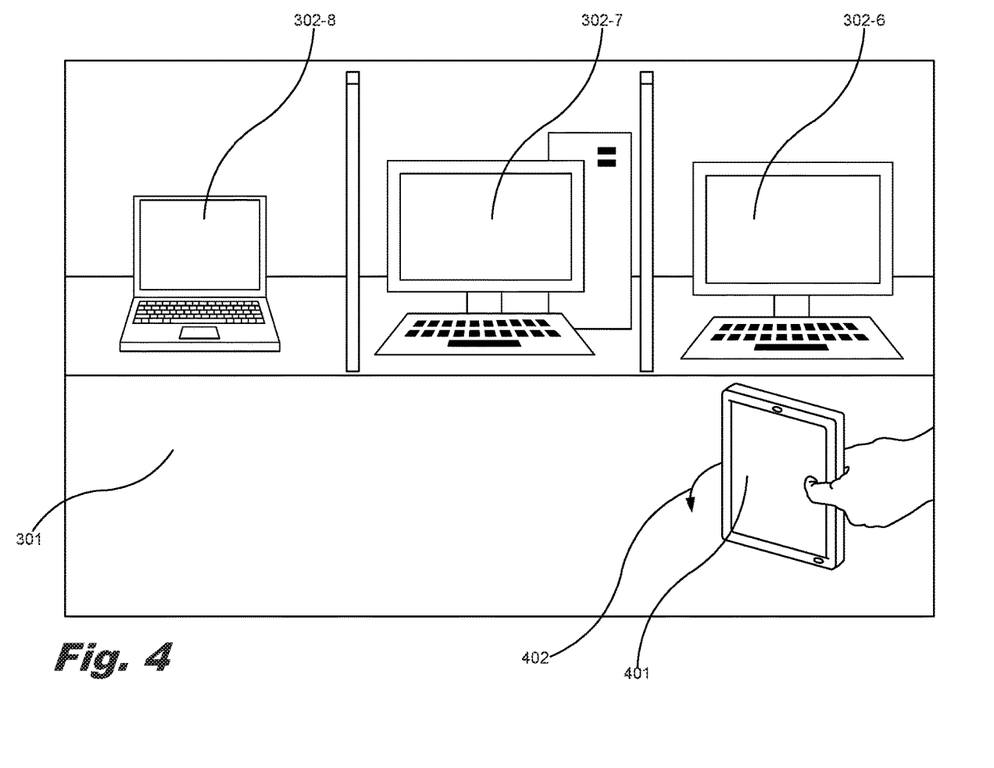
FIG. 4 is a diagram of the exposed, private area from the perspective of an imaging device, according to an example of the principles described herein.

FIG. 2 is a block diagram of an image capture device (100) for protecting privacy in video content, according to an example of the principles described herein. Further, FIG. 3 is a diagram of an office space floor plan (300) including an exposed, private area (301) from the perspective of an image capture device (100), according to an example of the principles described herein. FIG. 4 is a diagram of the exposed, private area (302) from the perspective of an image capture device (100) of FIG. 3, according to an example of the principles described herein. As depicted in FIGS. 3 and 4, a number of computing devices (302-1, 302-2, 302-3, 302-4, 302-5, 302-6, 302-7, 302-8, 302-9, collectively referred to herein as 302) are present within the office space floor plan (300). Computing device (302-2) includes an image capture device (100) that, when activated, may capture images of several elements in the background including the monitors of computing devices (302-6, 302-7, 302-8). It is quite possible that the users of computing devices (302-6, 302-7, 302-8) or the entity that those users may be working for may not wish to have the monitors of the computing devices (302-6, 302-7, 302-8) captured by the image capture device (100) because the monitors of the computing devices (302-6, 302-7, 302-8) may have displayed thereon private, proprietary, classified, or otherwise sensitive information displayed thereon. The examples of the image capture device (100) described herein provide for a method of ensuring that information displayed on the monitors of the computing devices (302-6, 302-7, 302-8) are not viewable. Further, as depicted in FIG. 4, additional devices may be momentarily presented in the private area (301) including, for example, tablet devices (401) that may be moving through the private area (301). In these instances, it may be desirable to ensure that any private, proprietary, classified, or otherwise sensitive information displayed on the tablet device (401) is also not viewable.

The image capture device (100) may be any device that is capable of capturing images. In one example, the image capture device (100) may be a video conferencing camera used to capture images of users during a video conferencing session. The image capture device (100) may be implemented in an electronic device. Examples of electronic devices include desktop computers, laptop computers, personal digital assistants (PDAs), mobile devices, smartphones, and tablets, among other electronic devices.

The image capture device (100) may be utilized in any data processing scenario including, stand-alone hardware, mobile applications, through a computing network, or combinations thereof. Further, the image capture device (100) may be used in a computing network, a public cloud network, a private cloud network, a hybrid cloud network, other forms of networks, or combinations thereof. In one example, the methods provided by the image capture device (100) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the image capture device (100) are executed by a local administrator.

To achieve its desired functionality, the image capture device (100) includes various hardware components. Among these hardware components may be a processor (101), a data storage device (102), a peripheral device adapter (103), a network adapter (104), an imaging device (110), and a neural network (120). These hardware components may be interconnected through the use of a number of busses and/or network connections. In one example, these hardware components may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of classifying, via a trained multi-level neural network, a plurality of objects within frames of a video content by inputting a plurality of pixels of at least one frame, fitting the pixels into different layers, and assigning weights to individual components within the layers. The executable code may, when executed by the processor (101), also cause the processor (101) to implement at least the functionality of determining if the classified objects are private objects or non-private objects, tracking the detected objects between each frame of the video content within a threshold distance of movement, and masking the private objects. The executable code may, when executed by the processor (101), also cause the processor (101) to implement at least the functionality of reclassifying the plurality of objects within the frames of the video content in response to a detection of movement of a previously classified object within the frames past the threshold distance of movement, detecting a shift of a privacy screen from a private viewing angle to a non-private viewing angle within the frames of the video content, and classifying the privacy screen as a private object in response to a detection of the privacy screen being oriented at the non-private viewing angle. All of these functions and others may be according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein. The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The peripheral device adapter (103) and the network adapter (104) in the image capture device (100) enable the processor (101) to interface with various other hardware elements, external and internal to the image capture device (100). For example, the peripheral device adapter (103) and/or the network adapter (104) may provide an interface to input/output devices, such as, for example, the neural network (120), a display device, a mouse, or a keyboard. The peripheral device adapter (103) may also provide access to other external devices such as an external storage device, a number of network devices such as, for example, servers, switches, and routers, client devices, other types of computing devices, and combinations thereof. The peripheral device adapter (103) may also create an interface between the processor (101) and a display device, a printer, or other media output devices. The network adapter (104) may provide an interface to other computing devices within, for example, a network, thereby enabling the transmission of data between the image capture device (100) and other devices located within the network including the neural network (101).

The imaging device (110) may be any device capable of capturing images. The imaging device (110) may utilize any sensor capable of detecting electromagnetic radiation including, for example, a photodetector, a photodiode, a charge-coupled device (CCD), a complementary metal-oxide-semiconductor (CMOS) image sensor, or other electromagnetic radiation detection devices used to capture images. The imaging device (110) may capture still images, video images, or combinations thereof.

In one example, the image capture device (100) may be coupled to the neural network (101) as separate devices. In another example, the neural network (101) may be included as part of the image capture device (100). In this example, the neural network (101) may be supported by the processing, hardware, and data storage resources of the image capture device (100).

The image capture device (100) further includes a number of modules used in the implementation of the methods described herein. The various modules within the image capture device (100) include executable program code that may be executed separately. In this example, the various modules may be stored as separate computer program products. In another example, the various modules within the image capture device (100) may be combined within a number of computer program products; each computer program product including a number of the modules.

The image capture device (100) may include a tracking module (115) to, when executed by the processor (101), detect and track objects within frames of the video content captured by the image capture device (100). The tracking module tracks these objects between the frames of the video content, and determines if the objects have moved between frames of the video content. The tracking module (115) receives from the neural network (120) an identification of various objects within the frames of the video content such as individuals within field of view of the image capture device (100), monitors of computing devices, screens of tablet computing devices, and other items.

The image capture device (100) may include a masking module (116) to, when executed by the processor (101), mask private objects within the frames. A private object may be any object in the field of view of the image capture device (100) that contains information a user or other user may not want to be seen or captured in the video content. For example, the private object may be a display device that may display proprietary information, classified information, private information, or other types of information that a user may desire not to be seen or recorded by another. The masking module (116) may receive from the neural network (120) an identification of private objects identified by the neural network (120) and tracked by the tracking module (115) in order to determine what objects to perform a masking process on within the captured frames. Masking by the masking module (116) may include any distortion of a portion of the frames at which a private object may be located, and may include, for example, blurring, digitizing, obscuring or removing those portions of the frames where the private objects are located.

The image capture device (100) may include a reclassifying module (117) to, when executed by the processor (101), reclassify the plurality of objects within the frames of the video content in response to a detection of movement of a previously classified object within the frames past the threshold distance of movement. In instances where the tracked objects move between the frames of the video content within a threshold distance as detected by the tracking module (115), the tracking module (115) may continue to track the objects, and the reclassifying module (117) may continually apply the classification provided to the tracking module (115) and the masking as applied by the masking module (116).

The image capture device (100) may also include a privacy screen detection module (117) to, when executed by the processor (101), detect a shift of a privacy screen from a private viewing angle to a non-private viewing angle within the frames of the video content, and, with the execution of the tracking module (115), the masking module (116) and the reclassifying module (117), classify the privacy screen as a private object in response to a detection of the privacy screen being oriented at the non-private viewing angle. In some instances, such as in the case depicted in FIG. 4 with regard to exposure of the tablet device (401), a screen of a computing device may be moved from a position at which the image capture device (100) cannot capture an image of the screen to a position at which the image capture device (100) may capture an image of the screen. This may be the case with any display device that is able to restrict angles of viewing of a monitor through a privacy screen to, for example, 15 degrees right and left of the screen. These privacy screens reduce the viewing angle of the display device to ensure that other individuals may not eavesdrop on a user and view what is being displayed. However, within the 30 degrees of viewable angles, the user may be able to see what is being displayed on the display device. Thus, if, for example, the tablet device (401) had this feature, and the tablet device were rotated from its angled position as depicted in FIG. 4 to a more forward-facing position following arrow 402 so that the tablet device (401) was facing the image capture device (100) within those viewable angles, the image capture device (100) could capture images of the rotated tablet device (401). Execution of the privacy screen detection module (117), in concert with the neural network (101), the tracking module (115), the masking module (116), and the reclassifying module (117), may detect a privacy screen within the field of view of the image capture device (100), detect the rotation of the privacy screen in a viewable angle, and perform the tracking, masking, and reclassifying processes described herein when the privacy screen is in a viewable position or orientation. Specifically, the tracking module (115) tracks the tablet device (401) and identifies an angle at which the tablet device (401) is angled with respect to the image capture device (100). If that angle changes, the tracking module (115) identifies that change in angle, and if that angle is an angle at which images of displayed information may be captured, the neural network (101) and/or reclassifying module (117) may classify it as a private object and the masking module (116) may obscure or otherwise mask the information displayed on the tablet device (401). Having described the systems and devices of the image capture device (100), the methods associated with the image capture device (100) will now be described in connection with FIGS. 5 through 7.

Figure 5:
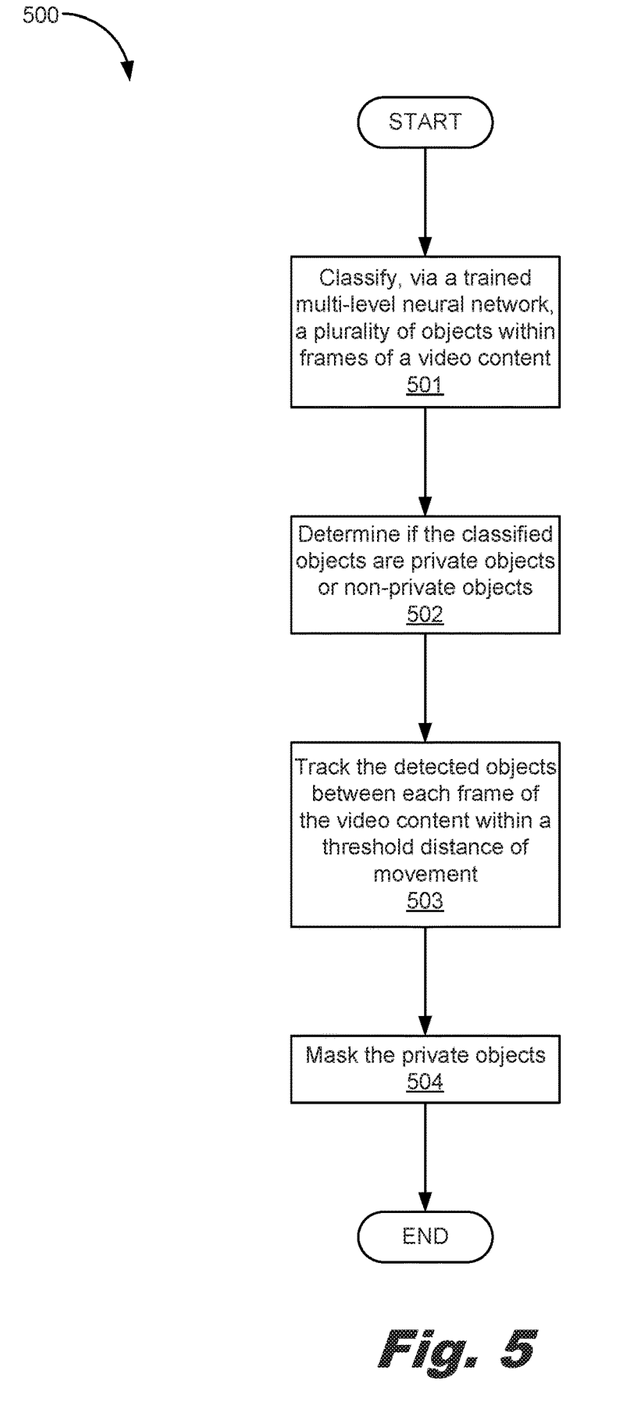
FIG. 5 is a flowchart showing a method of protecting privacy in video, according to an example of the principles described herein.

FIG. 5 is a flowchart showing a method (500) of protecting privacy in video, according to an example of the principles described herein. The method (500) may include executing the trained, multi-level neural network (101) to classify (block 501) a plurality of objects within frames of a video content captured by the imaging device (110) of the image capture device (100). Classifying (block 501) the plurality of objects within the frames may include inputting a plurality of pixels of at least one frame to the neural network (101), fitting the pixels into different layers, and assigning weights to individual components within the layers. These actions train the neural network (101) and allow the neural network to learn the difference between objects within a file of view of the image capture device (100) such as individuals, furniture, computing devices, and monitors in order to identify what items may be classified as a private object. A private object may be any object that a user may wish to not be viewable within the video content such as any computer monitor that may have private, proprietary, classified, or otherwise sensitive information displayed thereon.

The method (500) of FIG. 5 may also include determining (block 502) if the classified objects are private objects or non-private objects. The neural network (101) may classify the objects and may be trained to identify private objects such as the monitors of the computing devices (302-6, 302-7, 302-8) captured by the image capture device (100). These private objects are tracked (block 503) between each frame of the video content within a threshold distance of movement using the tracking module (115). The threshold distance of movement is any distance at which if the tracked objects were moved, the tracking module (115) will track them. If the tracked objects move beyond this threshold, the method (500) may be applied again with the neural network (101) classifying (block 501) the objects within frames of the video content captured by the imaging device (110) and determining (block 502) if the classified objects are private objects or non-private objects.

The method may also execute the masking module (116) to mask (block 504) the objects that are classified as private. Masking may include, for example, blurring, digitizing, obscuring or removing those portions of the frames where the private objects are located. This ensures that any sensitive information within the video content such as information displayed on monitors of the computing devices (302-6, 302-7, 302-8) captured by the image capture device (100) is not presented in the video content. In a scenario where the image capture device (100) is being used in a video conferencing instance, viewers of the private area (301) through the video conferencing instance will see masked portions in the background that obscure the private objects within the filed of view of the image capture device (100) resulting in no loss of private information via the video conferencing instance.

Figure 6:
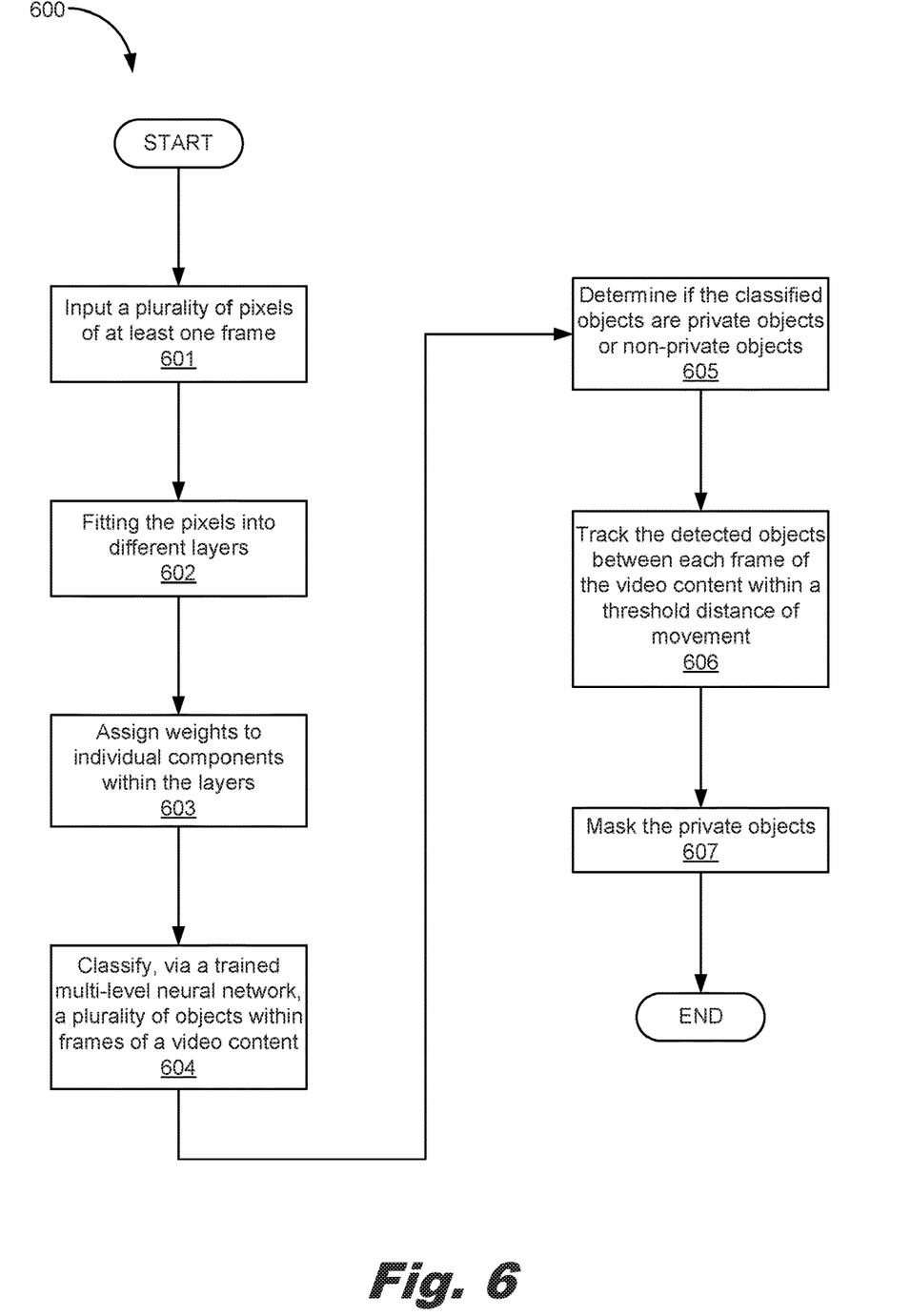
FIG. 6 is a flowchart showing a method of protecting privacy in video, according to an example of the principles described herein.

FIG. 6 is a flowchart showing a method (600) of protecting privacy in video, according to an example of the principles described herein. The method (600) may include executing the trained, multi-level neural network (101) to classify (block 501) a plurality of objects within frames of a video content captured by the imaging device (110) of the image capture device (100) by inputting (block 601) a plurality of pixels of at least one frame to the neural network (101). The neural network (101) may be already trained or may be continually trained, and inputting (block 601) the pixels of the frames of the video content may assist in that training by providing the neural network (101) with data to assist in that training process. The method (600) ma also include fitting (block 602) the pixels into different layers, and assigning (block 603) weights to individual components within the layers. These actions train the neural network (101) and allow the neural network to learn the difference between objects within a field of view of the image capture device (100) such as individuals, furniture, computing devices, and monitors in order to identify what items may be classified as a private object. The method (600) of FIG. 6 may also include classifying (block 604), via the trained multi-level neural network (101), a plurality of objects within the frames of video content.

The method (600) may continue with determining (block 605) if the classified objects are private objects or non-private objects. The neural network (101) may be trained to identify private objects captured by the image capture device (100). In one example, the private objects may include the monitors of the computing devices (302-6, 302-7, 302-8). These private objects are tracked (block 605) between each frame of the video content within a threshold distance of movement using the tracking module (115). The threshold distance of movement is any distance at which if the tracked objects were moved, the tracking module (115) will track them. If the tracked objects move beyond this threshold, the method (500) may be applied again with the neural network (101) classifying (block 604) the objects within frames of the video content captured by the imaging device (110) and determining (block 605) if the classified objects are private objects or non-private objects. The method may also execute the masking module (116) to mask (block 607) the objects that are classified as private as described herein.

Figure 7:
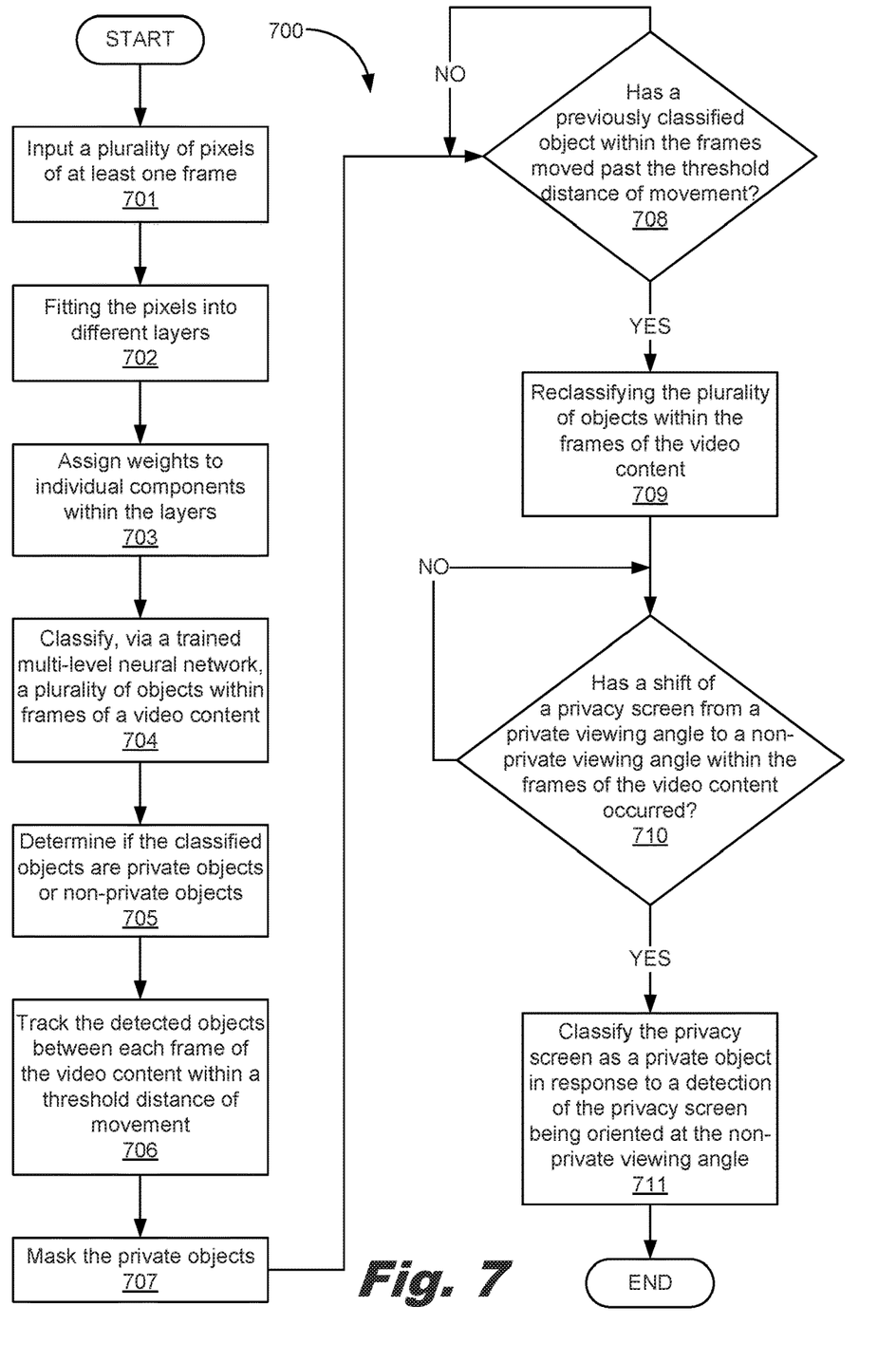
FIG. 7 is a flowchart showing a method of protecting privacy in video, according to an example of the principles described herein.

FIG. 7 is a flowchart showing a method (700) of protecting privacy in video, according to an example of the principles described herein. Blocks 701 through 707 of FIG. 7 proceed as described above in connection with blocks 601 through 607 of FIG. 6. At block 708, the method (700) may include determining whether a previously-classified object within the frames has moved past the threshold distance as detected by the tracking module (115). In response to the determination that a previously-classified object within the frames has not moved past the threshold distance (block 708, determination NO), the method (700) may loop back to the outset of block 708, and the threshold movement may be detected again. However, in response to the determination that a previously-classified object within the frames has moved past the threshold distance (block 708, determination YES), the reclassifying module (117) may be executed to reclassify the plurality of objects within the frames of the video content in response to the detection of movement of the previously classified object within the frames past the threshold distance of movement. In this example, the reclassifying module (117) reclassifies these objects when the tracking module (115) detects a shift in the field of view past a threshold distance, and continues to detect the private objects as identified by the neural network (120). The masking module (116) may also work in tandem with the reclassifying module (117) to continue to mask the private objects based on the action of the reclassifying module (117).

The method (700) may also include determining (block 710) whether a privacy screen has shifted from a private viewing angle to a non-private viewing angle within the frames of the video content. In response to a determination that the privacy screen has not shifted from a private viewing angle to a non-private viewing angle within the frames of the video content (block 710, determination NO), then the method (700) may loop back to the outset of block 710, and the shifting of any privacy screens may be detected again. However, in response to a determination that the privacy screen has shifted from a private viewing angle to a non-private viewing angle within the frames of the video content (block 710, determination YES), then the privacy screen may be classified as a private object by the neural network (101), and the execution of the tracking module (115), the masking module (116), and the reclassifying module (117).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the image capture device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe systems and methods for protecting privacy in video. The method may include classifying, via a trained multi-level neural network, a plurality of objects within frames of a video content. Training the multi-level neural network may include inputting a plurality of pixels of at least one frame, fitting the pixels into different layers, and assigning weights to individual components within the layers. The method may also include determining if the classified objects are private objects or non-private objects, tracking the detected objects between each frame of the video content within a threshold distance of movement, and masking the private objects.

The examples described herein provide for an automatic way to prevent the accidental disclosure of sensitive information by a user engaging in, for example, a video conference instance. Because users may be aware of content they may be sharing on their own devices, but not so much about the contents visible in other display devices in the background, the autonomous masking of these display devices greatly increases security by protecting sensitive information displayed on the display devices. The systems and methods described herein ensure a safer video sharing experience.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of protecting privacy in video, comprising:
classifying, via a trained multi-level neural network, a plurality of objects within frames of a video content, the training of the neural network comprising:
inputting a plurality of pixels of at least one frame;
fitting the pixels into different layers; and
assigning weights to individual components within the layers;
determining if the classified objects are private objects or non-private objects;
classifying a non-private object as a private object in response to a detection of a shift in a viewing angle of the non-private object within the frames of the video content;
tracking the detected objects between each frame of the video content within a threshold distance of movement; and
masking the private objects.

2. The method of claim 1, comprising reclassifying the plurality of objects within the frames of the video content in response to a detection of movement of a previously classified object within the frames past the threshold distance of movement.

3. The method of claim 1, wherein the video is captured via a video conferencing device.

4. The method of claim 1, wherein the trained multi-level neural network is a self-learning neural network.

5. The method of claim 1, comprising:
   detecting a shift of a privacy screen from a private viewing angle to a non-private viewing angle within the frames of the video content; and
   classifying the privacy screen as a private object in response to a detection of the privacy screen being oriented at the non-private viewing angle.

6. The method of claim 1, wherein tracking the detected objects between each frame of the video content comprises tracking the detected objects between less than all the frames.

7. The method of claim 1, wherein the detection of a shift in a viewing angle comprises detecting rotation of a screen of a computing device detected within the frames of the video.

8. The method of claim 7, wherein the screen of the computing device is classified as a private object in response to determining that the screen has moved within the frames of the video content from a first position in which information displayed by the screen is unobservable to a second position in which information displayed by the screen is observable.

9. A non-transitory computer readable medium comprising computer usable program code embodied therewith, the computer usable program code to, when executed by a processor:
   classify, via a trained multi-level neural network, a plurality of objects within frames of video content:
   determine if the classified objects are private objects or non-private objects, wherein a privacy screen with a private viewing angle is classified as a non-private object;
   detect a shift of the privacy screen from the private viewing angle to a non-private viewing angle within the frames of the video content;
   classify the privacy screen as a private object in response to a detection of the privacy screen being oriented at the non-private viewing angle; and
   mask the private objects.

10. The computer readable medium of claim 9, comprising computer usable program code to, when executed by the processor, track the detected objects between the frames of the video content within a threshold distance of movement.

11. The computer readable medium of claim 10, wherein tracking the detected objects between the frames of the video content within a threshold distance of movement comprises tracking the detected objects between less than all the frames.

12. The computer readable medium of claim 9, wherein classifying the plurality of objects within frames comprises:
   inputting a plurality of pixels of at least one frame;
   fitting the pixels into different layers; and
   assigning weights to individual components within the layers.

13. The computer readable medium of claim 9, wherein the frames of the video content are captured using a video conferencing imaging device.

14. The computer readable medium of claim 9, wherein detecting the shift of the privacy screen from the private viewing angle to a non-private viewing angle comprises:
   identifying an angle at which the privacy screen is angled with respect to an image capture device capturing the video content; and
   determining a change in the angle of the privacy screen.

15. The computer readable medium of claim 14, wherein classifying the privacy screen as a private object comprises determining that the change in the angle of the privacy screen allows the image capture device to capture images of displayed information on the privacy screen.

16. The computer readable medium of claim 9, wherein the privacy screen comprises a display device of a computing device.

17. An image capture device for protecting privacy in video content, comprising:
   a neural network to classify a plurality of objects within frames of video content captured by the image capture device;
   a tracking module to track the detected objects between the frames of the video content within a threshold distance of movement;
   a masking module to mask private objects within the frames; and
   a reclassifying module to reclassify the plurality of objects within the frames of the video content in response to a detection of movement of a previously classified object within the frames past the threshold distance of movement.

18. The image capture device of claim 17, wherein the neural network:
   fits a plurality of pixels of at least one frame into different layers;
   assigns weights to individual components within the layers; and
   determines if the classified objects are the private objects or are non-private objects.

19. The image capture device of claim 17, comprising:
   a privacy screen detection module to:
   detect a shift of a privacy screen from a private viewing angle to a non-private viewing angle within the frames of the video content; and
   classify the privacy screen as a private object in response to a detection of the privacy screen being oriented at the non-private viewing angle.

20. The image capture device of claim 17, wherein the tracking module tracks the detected objects between less than all the frames.

* * * * *